C. GILES.
STEERING MECHANISM FOR CYCLES.
APPLICATION FILED MAY 21, 1915.
1,175,744.
Patented Mar. 14, 1916.
2 SHEETS—SHEET 1.
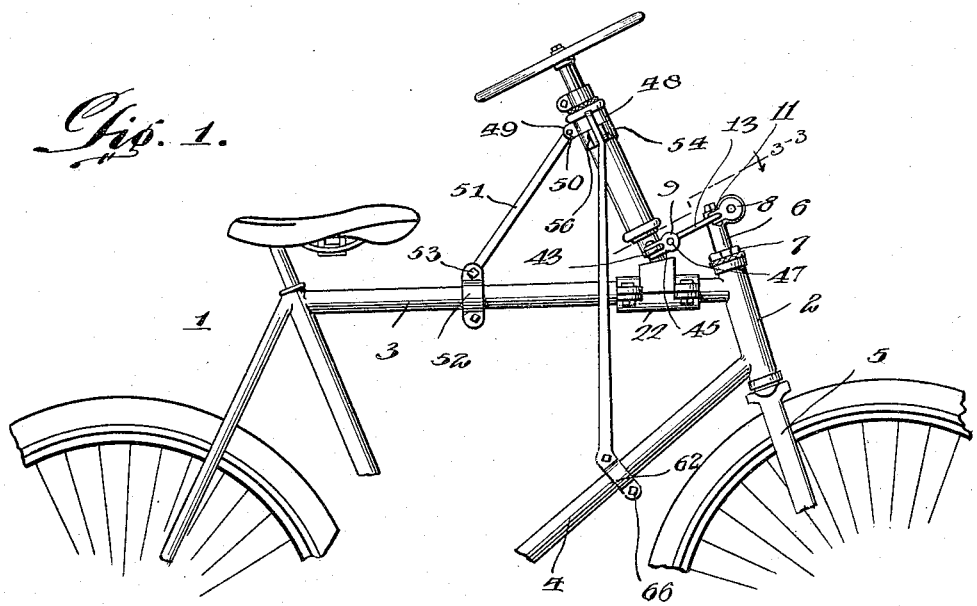
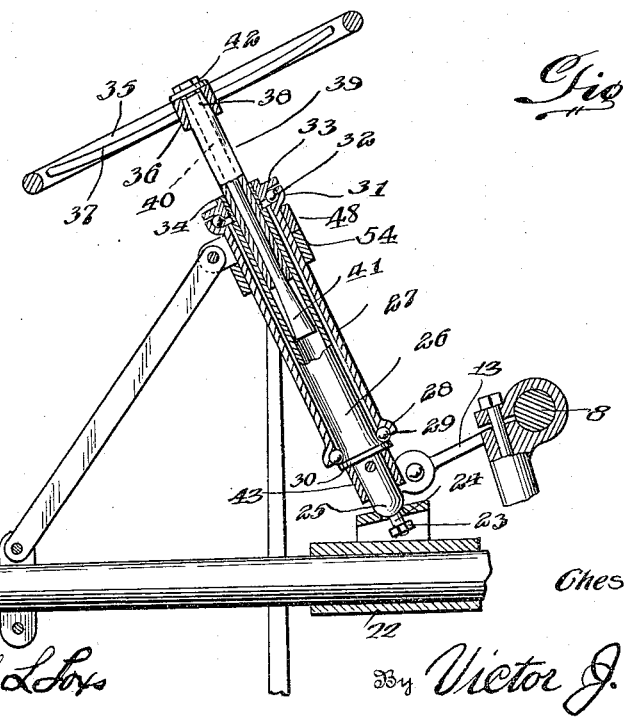
Inventor
Chester Giles.
Witnesses
By Victor J. Evans.
Attorney C. GILES.
STEERING MECHANISM FOR CYCLES.
APPLICATION FILED MAY 21, 1915.
1,175,744.
Patented Mar. 14, 1916.
2 SHEETS—SHEET 2.
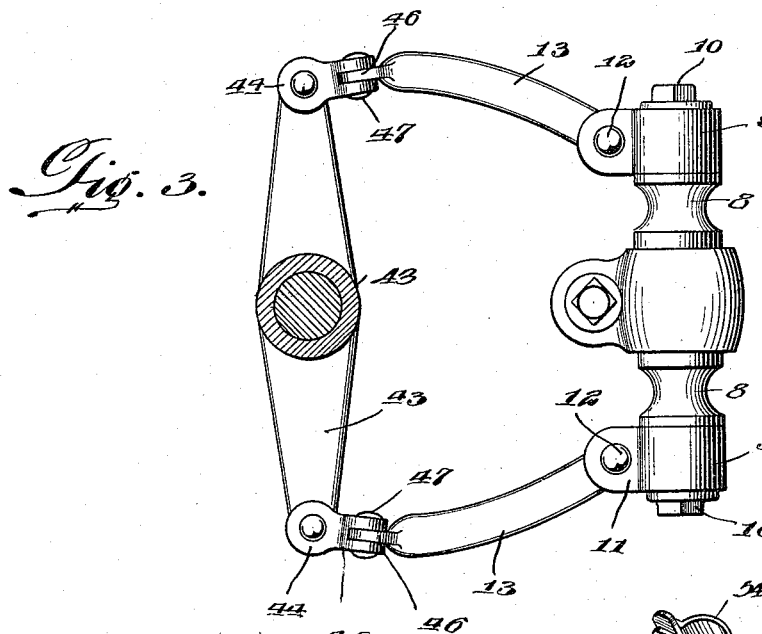
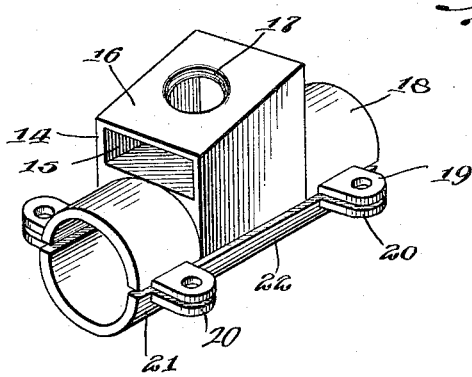
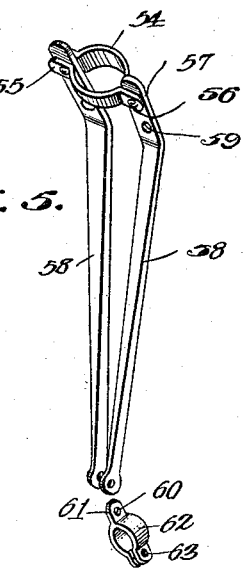
Inventor
Chester Giles.
Witnesses
Frederick L. Fox.
By Victor J. Evans.
Attorney

UNITED STATES PATENT OFFICE.

CHESTER GILES, OF MOWEAQUA, ILLINOIS, ASSIGNOR OF ONE-HALF TO CYRUS S. WEAKLY, OF MOWEAQUA, ILLINOIS.

STEERING MECHANISM FOR CYCLES.

1,175,744.  Specification of Letters Patent.  Patented Mar. 14, 1916.

Application filed May 21, 1915. Serial No. 29,616.

*To all whom it may concern:*

Be it known that I, CHESTER GILES, a citizen of the United States, residing at Moweaqua, in the county of Shelby and State of Illinois, have invented new and useful Improvements in Steering Mechanism for Cycles, of which the following is a specification.

The present invention relates to improvements in means for guiding or directing vehicles, such as a bicycle or motorcycle.

In carrying out my invention it is my purpose to dispense with the ordinary handle bars and to substitute in lieu thereof a turning wheel which may be so arranged and positioned with relation to the rider that the latter may assume an upright and comfortable position upon the mount and thus obviate injury incident to bending the back of the rider as well as to relieve his arms from the strain necessarily imparted thereto when in the above-mentioned riding position.

I also aim to provide a device of this character which may be easily and quickly positioned upon the frame of any ordinary bicycle or motorcycle, one wherein the parts may be so adjusted that the same may be easily and quickly positioned to accommodate machines of various sizes and likewise riders of varying proportions.

It is a still further object of the invention to provide an apparatus of this character which shall embody the desirable features of cheapness in manufacture, simplicity in structure and ease and accuracy in operation.

With the above and other objects in view, the improvement resides in the construction, combination and arrangement of parts set forth in the following specification and falling within the scope of the appended claims.

In the drawings: Figure 1 is an elevation illustrating my improvement attached to an ordinary construction of bicycle frames, Fig. 2 is a central vertical longitudinal sectional view through the same, Fig. 3 is a horizontal sectional view approximately on the line 3—3 of Fig. 1, Fig. 4 is a detail perspective view of the box or sleeve member which supports the head tube and which is attached to the top run of the cycle frame, and Fig. 5 is a perspective view of the side braces.

As my improvement is attached to and in reality may be considered a part of a bicycle or motorcycle frame, it is thought necessary that parts of said frame be briefly referred to, and therefore, in the drawings, the frame is broadly indicated by the numeral 1 and includes a head tube 2, a top run 3 and a reach bar 4. The fork for the front wheel is indicated by the numeral 5 and has the usual slotted stem that is arranged within the head tube 2.

The numeral 6 designates the post which is arranged in the head tube 2, the said post being provided with the usual spreader member having its threaded shank extending through a central opening in the post provided with the usual adjusting nut, while the numeral 7 designates a retaining nut which engages with the post and which rests upon the top of the head tube 2.

The post in the present instance has secured thereon a laterally extending member 8, the said member having its ends reduced and rounded in cross section to receive the body portions of spring clips 9, while flanged nuts 10 enter suitable threaded orifices in the ends of the said member 8 to force the clips 9 into contact with the shoulders formed by the aforementioned reduced ends of said member 8. The clips comprise each a split member, the ends of which are extended to form ears 11, and received between the ears and pivotally secured thereto, as at 12, are link members 13.

The numeral 14 designates a box which is received on the top run 3 of the frame. The box is integrally formed with a semi-cylindrical member or extension 18 having lateral ears 19 and providing what may be termed one of the sections of the sleeve. The other member 22 of the sleeve includes a semi-cylindrical section 21 having ears 20 which register with the ears 19, and suitable securing elements pass through openings in the ears to clamp the sections to the top run of the frame. The box 14 is provided with a longitudinally arranged passage 15, and the top of said box is inclined, as indicated by the numeral 16. The inclined top 16 is centrally provided with a round opening 17, the purpose of which will presently be set forth. By constructing the sleeve of a box as described, it will be noted that the said box may be longitudinally adjusted upon the top run of the frame.

Passing through the opening 17 and secured in the box 14 through the medium of a nut 23 is the reduced threaded extension 24 provided upon the round end 25 of a post 26. This post has its upper end hollow. The post 26 is received within what I will term a head tube 27 and the lower end of said tube 27 is formed with an annular lip 28 providing a race-way for anti-frictional members 29 which bear upon the outcurved surface formed above or at the juncture of the flange 30 provided upon the post 26. The opposite end of the hollow head tube 27 is also formed with a dished flange 31 which provides a race-way for anti-frictional balls 32, the flanged sleeve 33 of a sustaining nut member 34 also being engaged by the anti-frictional members 32. This nut member 34 has a threaded engagement with the upper end of the post 26.

The numeral 35 designates a hand wheel which has its hub 36 connected therewith through the medium of spokes 37, and the bore of said hub is preferably of a conical formation, to receive the cone-shaped end 38 of a tubular member 39. Said tubular member 39 enters the hollow head post 26 and has its lower end slitted to provide compressible portions. Passing through the tubular member 39 is the threaded stem 40 of a spreader member 41, the wedge-shaped or conical spreader engaging with the slitted portion of the tubular member 39 to press the same against the inner bore of the post 26. The shank 40 extends through the end of the tubular member 39, and is engaged by a flanged nut 42 that bears upon the hub 36 of the wheel 35. This nut is employed for adjusting the spreader 41 to tightly retain the tube 39 in adjusted position with relation to the post 26 of the head tube 27.

Centrally secured upon the lower end of the post 26 below its flange 30 is a turning arm 43, the opposite ends of said arm having pivotally secured thereto, as at 44, the inner longitudinal bifurcated ends 44 of the knuckle members 45, and the free ends of said knuckles 45 are bifurcated in a vertical direction to receive the reduced ends or tongues 46 of the links 13, the said ends 46 being pivoted to the knuckles, as at 47.

The numeral 48 designates a split collar which surrounds the head tube 27 below the lip 31 thereof and which preferably contacts with the said lip. The collar has its ends bent to provide spaced ears 49. Pivotally secured, as at 50, between the said ears is the rear brace rod or member 51 of the device.

The numeral 52 designates an adjustable sleeve which is secured to the top run 3 and which pivotally connects with the rear brace 51, as indicated by the numeral 53.

Surrounding the head tube 27 and disposed below the collar 48 is a split collar 54, the same preferably comprising two members each having its end formed with laterally extending ears 55 and pivoted, as at 56, between the said ears 55 are the angular ends 57 of rods 58—58 which provide the side brace for the device. The ends 57 of the said members 58 are provided with a plurality of openings 59, and the pivot 56 may be passed through any of the openings to adjustably retain the members 58 upon the split collar 54. The lower and free ends of the rods 58 are pivotally secured, as at 60, to an angular ear 61 provided upon a split sleeve or collar 62, the said sleeve or collar having its ends off-set and formed with extensions providing ears 63. The ears are connected by a suitable adjusting element 66 so that the sleeve or collar may be retained in an adjusted position on the reach bar 4.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a device for the purpose set forth, the combination with a bicycle frame, including a head tube, and a handle post received in the head tube, of a laterally extending member connected with the handle post, a longitudinally adjustable boxing arranged upon the top run of the frame, a post loosely connected with the boxing, a head tube surrounding the post, a tubular member adjustably secured to the post, a turning wheel for the tubular member, a rear brace for the head tube, connected with the top run of the frame, side braces for the tube connected with the reach bar of the frame, a turning arm extending laterally from the post, and link members connecting the turning arm with the lateral member of the handle post.

2. The combination with a bicycle frame including a handle post received in the head tube thereof, of a member centrally secured to the handle post, a boxing adjustably and removably secured to the top run of the frame, said boxing having an upper inclined face, a post having a rounded end resting upon the inclined face of the boxing and loosely secured to the said boxing, an arm centrally connected with the post, pivoted links connecting the arm with the ends of the member upon the handle post, a head tube surrounding the post, anti-frictional members between the head tube and post, a tubular member adjustably arranged within the post and projecting therefrom, means for adjustably securing the tubular member to the post, a turning wheel connected with the tubular member, adjustable sleeves secured upon the top run and upon the reach bar of the frame, rod members pivotally connected with the head tube and pivotally connected with the said sleeves.

3. In combination with a bicycle or motorcycle, of a turning wheel supported upon the top run of the frame, brace means for the turning wheel connected with the top run and with the reach bar of the frame, means for adjusting the said brace members for tilting the turning wheel, means for vertically adjusting the turning wheel, and connecting members between the turning wheel and the handle bar post.

4. The combination with a bicycle frame including a handle post received in the head thereof, of a laterally extending member secured to the post, a longitudinally adjustable box secured to the top run of the frame, a post loosely connected with the box, a laterally extending turning arm upon the post, link connections between the ends of the arm and the ends of the lateral member of the handle post, a tube surrounding the post, brace members connected with the tube and adjustably secured to the frame, a turning wheel, and a vertically adjustable connection between the turning wheel and the post.

In testimony whereof I affix my signature in presence of two witnesses.

CHESTER GILES.

Witnesses:
RALPH AYARS,
M. S. AYARS.

Copies of this patent may be obtained for five cents each, by addressing the "Commissioner of Patents, Washington, D. C."